United States Patent [19]
Krein et al.

[11] Patent Number: 5,848,297
[45] Date of Patent: Dec. 8, 1998

[54] CONTROL APPARATUS FOR MAINTAINING ORDER AND ACCOMPLISHING PRIORITY PROMOTION IN A COMPUTER INTERCONNECT

[75] Inventors: William T. Krein, San Jose; Steven G. Roskowski, Sunnyvale, both of Calif.

[73] Assignee: Apple Computer, Inc., Cupertino, Calif.

[21] Appl. No.: 815,694

[22] Filed: Dec. 30, 1991

[51] Int. Cl.[6] .................................................. G06F 13/38
[52] U.S. Cl. ...................... 395/876; 395/200.62; 395/853
[58] Field of Search .................................. 395/275, 250, 395/200, 876, 853, 200.62

[56] References Cited

U.S. PATENT DOCUMENTS

| | | | |
|---|---|---|---|
| 3,109,162 | 10/1963 | Wolensky. | |
| 4,276,611 | 6/1981 | Jansen et al. | 364/900 |
| 4,402,040 | 8/1983 | Evett et al. | 364/200 |
| 4,413,258 | 11/1983 | Quick et al. | 340/825.5 |
| 4,423,480 | 12/1983 | Bauer et al. | 395/325 |
| 4,525,849 | 7/1985 | Wolf | 375/118 |
| 4,527,233 | 7/1985 | Ambrosius, III et al. | 364/200 |
| 4,620,278 | 10/1986 | Ellsworth et al. | 364/200 |
| 4,621,342 | 11/1986 | Capizzi et al. | 364/900 |
| 4,683,534 | 7/1987 | Tietjen | 364/200 |
| 4,766,536 | 8/1988 | Wilson | 364/200 |
| 4,766,538 | 8/1988 | Miyoshi | 364/200 |
| 4,837,682 | 6/1989 | Culler | 364/200 |
| 4,864,496 | 9/1989 | Triolo et al. | 364/200 |
| 4,920,486 | 4/1990 | Nielsen | 364/200 |
| 4,937,733 | 6/1990 | Gillett, Jr. et al. | 364/200 |
| 4,953,081 | 8/1990 | Feal et al. | 364/200 |
| 4,956,771 | 9/1990 | Neustaedter | 395/650 |
| 4,965,723 | 10/1990 | Kirk et al. | 364/200 |
| 5,097,437 | 3/1992 | Larson | 395/775 |
| 5,111,424 | 5/1992 | Donaldson | 395/725 |
| 5,113,369 | 5/1992 | Kinoshita | 395/325 |
| 5,167,019 | 11/1992 | Faua et al. | 395/200 |
| 5,191,653 | 3/1993 | Banks | 395/275 |
| 5,193,149 | 3/1993 | Awiszio et al. | 395/200 |
| 5,193,197 | 3/1993 | Thacker | 395/725 |
| 5,220,653 | 6/1993 | Miro | 395/275 |
| 5,222,223 | 6/1993 | Webb, Jr. et al. | 395/425 |
| 5,265,215 | 11/1993 | Fukuda et al. | 395/325 |

FOREIGN PATENT DOCUMENTS

| | | |
|---|---|---|
| 0038189 | 10/1981 | European Pat. Off. . |
| 0121030 | 10/1984 | European Pat. Off. . |
| 0127007 | 12/1984 | European Pat. Off. . |
| 0141742 | 5/1985 | European Pat. Off. . |
| 0240749 | 10/1987 | European Pat. Off. . |
| 2256563 | 12/1992 | United Kingdom . |

OTHER PUBLICATIONS

Japanese Application, No. 1-24664, Oct. 2, 1989.

*Primary Examiner*—Thomas C. Lee
*Attorney, Agent, or Firm*—Blakely, Sokoloff, Taylor & Zafman

[57] ABSTRACT

A circuit for maintaining the order of transmission of information in a computer interconnect including control circuitry for sending a signal from a source of data to a destination for data indicating that data is ready for transfer, the control circuitry comprising a plurality of buffers for storing information relating to the data, the information including information regarding the order in which the information was received by the control circuitry, means for incrementing the information regarding the order in which the information was received by the control circuitry, and apparatus for sending the information relating to the data to the destination for data in the order of receipt by the control circuitry.

28 Claims, 7 Drawing Sheets

CONTROL APPARATUS FOR MAINTAINING ORDER AND ACCOMPLISHING PRIORITY PROMOTION IN A COMPUTER INTERCONNECT

BACKGROUND OF THE INVENTION

1. Field of the Invention

This invention relates to computer interconnect circuitry and, more particularly, to methods and apparatus for maintaining the correct order of data transferred from a source to a destination through computer interconnect circuitry and for relieving blockages created in computer interconnect circuitry by lower priority data filling the pipeline and precluding higher priority data from access.

2. History of the Prior Art

Computer systems usually employ busing arrangements to transfer information between the individual components of the system. Such busing arrangements are capable of handling data from a only single source component at a time. Consequently, such busing arrangements include some means for deciding which data is to be transferred first. Such means for deciding are referred to as arbitration circuits. When a source component desires to write data to some other destination component, it signals that the data is ready and provides an address to which the data is to be written. If more than one source component has data to transfer, the arbitration circuitry decides the source from which to transfer data first. The arbitration circuit bases its selection of a particular source to transfer data based on some particular criteria. The criteria for the selection is often extremely arbitrary. For example, selection might depend on which source component is sending the data; the component in slot A might always send first, followed by the component in slot B, and so on.

While the typical computer system utilizes a busing arrangement as the interconnection to transfer data from one component of the system to another, the requirements for pathways to handle more and more information faster have increased to the point that various functions cannot be performed by the typical busing arrangement. Functions such as the presentation of animated graphics and television require the transfer of so much data that the entire busing arrangement must be devoted to their use. When it is desired to incorporate a number of these functions into the same computer system and to run more than one of these operations at once, a typical busing arrangement is incapable of supporting the required bandwidth.

United States patent application Ser. No. 07/816,346, entitled INTERCONNECT SYSTEM ARCHITECTURE, Roskowski et al, filed on even date herewith, and assigned to the assignee of the present invention, discloses a high speed interconnect for a computer system which allows a plurality of data sources to transfer very large amounts of data to a plurality of destinations concurrently. The interconnect disclosed in this patent application includes a plurality of nodes each of which is capable of joining to a component of a computer. Each node comprises apparatus for transferring signals between the component and the node including apparatus for automatically translating between data formats. Each node also includes circuitry for storing a plurality of multiword packets of data from the associated component. Circuitry is also provided at each node for signalling each other node that a packet of data exists for transfer to the component associated with that other node and for sensing signals from another node indicating that a packet of data exists for transfer to the component associated with that node. Finally, each node is connected to each other node by circuitry for transferring packets of data stored at the node.

This interconnect essentially provides a plurality of individual paths which may simultaneously transfer data between each of the components of a computer system and between each of those components and any system peripheral connected through the interconnect. The interconnect disclosed in the above-mentioned patent application operates to transfer data very rapidly between components. For example, a simple interconnect connecting four components of a computer system is capable of transferring twice as much data as can the most advanced busing arrangements.

One reason the interconnect disclosed in the above-mentioned patent application operates so rapidly to transfer data between components is because such data is transferred in packets. Transferring data in large packets, however, means that the time required for individual transfers is usually longer than the time required for transfer of single words as in an ordinary busing system. Since these transfers take a longer time, conflicts between data are more likely. Consequently, arbitration arrangements for determining which data is next to be transferred are especially important to such a system.

United States patent application Ser. No. 07/815,825, entitled APPARATUS FOR PROVIDING PRIORITY ARBITRATION IN A COMPUTER SYSTEM INTERCONNECT, Roskowski et al, filed on even date herewith, and assigned to the assignee of the present invention, discloses an arrangement for using values called priorities assigned to data by the source of the data to determine which data is next to be transferred. The system compares the priorities assigned to data by each source component to determine which of the available packets of data should next be transferred. The interconnect allows each node to accept data from a plurality of sources. However, it requires that only one packet of data of a particular priority be presented from any one source of data to the arbitration circuitry at any node at any one time. Consequently, there is a need for circuitry to assure that this is true.

Moreover, because a number of different packets of data of the same priority may be available simultaneously at a source node and only one may be presented for arbitration, it is necessary to maintain the correct order of the data packets offered at a particular priority level by a source component. Unless order is maintained, data at a particular priority level which would normally be expected to appear later than other data of the same priority level may appear before other data necessary to its use.

Furthermore, as with all computer systems, there is a limited amount of storage to hold data at each source so it is possible for the storage space to be filled with low priority data packets. These low priority data packets can block access by higher priority data packets so that the arbitration circuitry does not know of the existence of the higher priority data packets. Since the lower priority data packets will not be transferred while higher priority packets from other nodes have access to the arbitration circuitry, those higher priority packets which are blocked and do not have access to the arbitration circuitry remain blocked. Such a condition can halt the operation of any computer system.

SUMMARY OF THE INVENTION

It is, therefore, an object of the present invention to provide apparatus for assuring that only a single packet of data of a particular priority is made available at any given time from any source to an arbitration circuit of a computer.

It is another object of the present invention to provide apparatus for assuring that the order in which individual packets of data of a particular priority are presented to the arbitration circuitry of a computer is maintained even though the transfer of individual packets of data at that priority are delayed.

It is another object of the present invention to provide means for eliminating system blockages caused by lower priority data blocking access to priority arbitration circuitry by higher priority data.

These and other objects of the present invention are realized in a circuit for maintaining the order of transmission of information in a computer interconnect comprising control circuitry for sending a signal from a source of data to a destination for data indicating that data is ready for transfer, the control circuitry comprising a plurality of buffers for storing information relating to the data, the information including information regarding the order in which the information was received by the control circuitry, means for incrementing the information regarding the order in which the information was received by the control circuitry, and means for sending the information relating to the data to the destination for data in the order of receipt by the control circuitry.

The circuit also includes means for designating the priority of the data ready for transfer, means for maintaining the order of transfer within each particular priority level, and means for promoting priority levels of lessor priority data in order to remove blockages to higher priority data.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. In all cases the distinction between the method operations in operating a computer and the method of computation itself should be borne in mind. The present invention relates to apparatus for operating a computer in processing electrical or other (e.g. mechanical, chemical) physical signals to generate other desired physical signals.

DETAILED DESCRIPTION OF THE INVENTION

Figure 1:
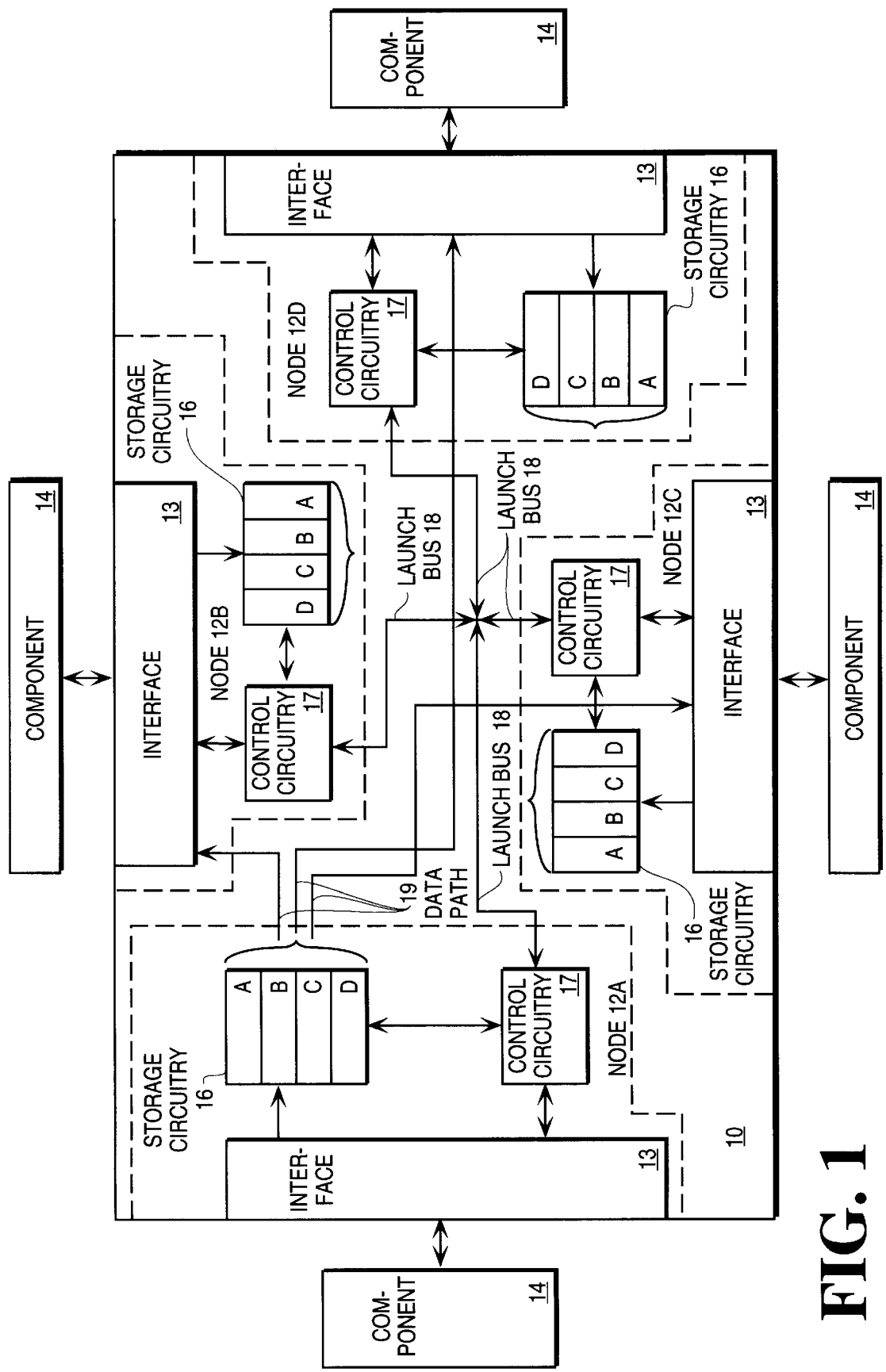
FIG. 1 is a block diagram illustrating a computer system interconnect constructed in accordance with the first above-mentioned patent application.

Referring now to FIG. 1, there is illustrated an interconnect 10 designed in accordance with the first above-mentioned patent application. The interconnect 10 illustrated includes four nodes 12 each of which may be connected by an interface 13 to a computer system component or peripheral 14. Each node 12 includes storage circuitry 16 for receiving and storing data from the associated component 14 in a plurality of packets. In the embodiment illustrated, four individual storage buffers for storing packets are illustrated; these storage buffers are individually referred to by the letters A, B, C, and D in the figure. In a preferred embodiment of the interconnect 10 designed in accordance with the above-mentioned patent application, each packet stored in a storage buffer may comprise up to sixty-four bytes of data.

Also included at each node 12 is control circuitry 17 which is adapted to utilize information provided by the components 14 to control the transfer of the data at any node 12 to a component 14 connected to any other node 12. The control circuitry 17 of each node 12 is connected to transfer control information to the control circuitry 17 of each other node by a launch bus or buses 18.

In order to facilitate the rapid transfer of data by means of a computer system interconnect, it is at least useful and often necessary to provide circuitry for arbitrating among the various pieces of data available in order to determine which data is to be utilized first. In this manner, a computer may handle first that data which is most important to its operation and may delay the transfer of data which is less essential to its operation. This is especially important in systems which rely on a busing arrangement for transfer of data between system components since only one piece of data may be transferred at any time by a busing arrangement.

In order to allow arbitration among packets of data, part of the information provided by a component to the above-mentioned interconnect about each packet of data to be transferred is the destination for the data and the importance of the data (called its priority level) as determined by the source component. In any particular computer system utilizing the interconnect 10, the determination of the priority levels will depend upon the requirements of the particular system and may be considered to be arbitrary. This priority information, along with other control information, is sent on the launch bus 18 from the control circuitry 17 of the source node 12 to the control circuitry 17 of the destination node 12. The circuitry for controlling the priority arbitration is among that included within the control circuitry 17 illustrated in FIG. 1 and may be considered to be part of each destination node 12. This circuitry is described in the copending patent application referred to above entitled APPARATUS FOR PROVIDING PRIORITY ARBITRATION IN A COMPUTER SYSTEM INTERCONNECT.

The packets of data held in the storage circuitry 16 at each source node 12 are transferred from the circuitry 16 under control of the control circuitry 17 by data paths 19 directly connected to the interface 13 of each other node. Only one set of these direct connections is illustrated in FIG. 1 (the paths 19 from the node 12 at the left of the figure) in order not to complicate the drawing.

The patent application just referred to above discloses an arrangement for using the source-provided priority levels in order to determine which data is next to be transferred. The priority arbitration system at each destination node compares the priorities of the packets of data available to it from each source node to determine which of the packets should next be transferred to the destination component. The priority arbitration system requires, however, that only one packet of data of a particular priority be presented to the arbitration circuitry at the destination component at any one time from any one source. Consequently, there is a need for circuitry to assure that this is true.

Moreover, in the interconnect described there is a limited amount of storage at each node to hold data. It is possible for the storage space to be filled with low priority data which block access by higher priority data so that the arbitration circuitry is not aware of the existence of the higher priority data. So long as higher priority data is available from another source, the low priority data will continue to block the hidden but higher priority data from access to the priority arbitration circuitry. Such a blockage in the operation of any computer system can cause the system to fail due to a lack of performance.

Another example of a blocking problem involves a computer processor running real time operations. In such a situation, the processor cannot afford to be interrupted by trivial information and will set a cutoff level and ignore data of a priority lower than the cutoff level. For example, although information from a peripheral device stating that it is connected and exists is unimportant to the real time process if that peripheral device is not needed for the operation and so will be below the cutoff level, information that the process being run is changing in some aspect (a color change, for example) is important, has a priority level above the cutoff, and should be processed. Presuming, however, that there are a number of lower priority packets of information available which the processor knows it does not need and presuming that these low priority packets fill the available storage space at a node of the interconnect at which the high priority information should be available, the processor will have no way of detecting that the higher priority information which it needs even exists. For this reason, it is necessary to provide some arrangement for eliminating these blockages so that data of higher priority may be presented to the system for use.

The arrangement provided by the present invention provides for eliminating blockages of this sort by a process called promotion. The circuitry executing the process senses when data of a higher priority is blocked by data packets of lower priority and promotes the priority of a packet of low priority data having the highest priority to the level of the data being blocked. Since the low priority data is labelled as high priority data, it will be handled out of order with regard to other priority levels and thereby provide access to the arbitration circuitry for the blocked higher priority data. Where there are a number of packets of blocking data having the same low priority level, the process selects the oldest for promotion so that the order of the data within a priority level is maintained even though the priority level of a particular packet is raised.

Figure 2:
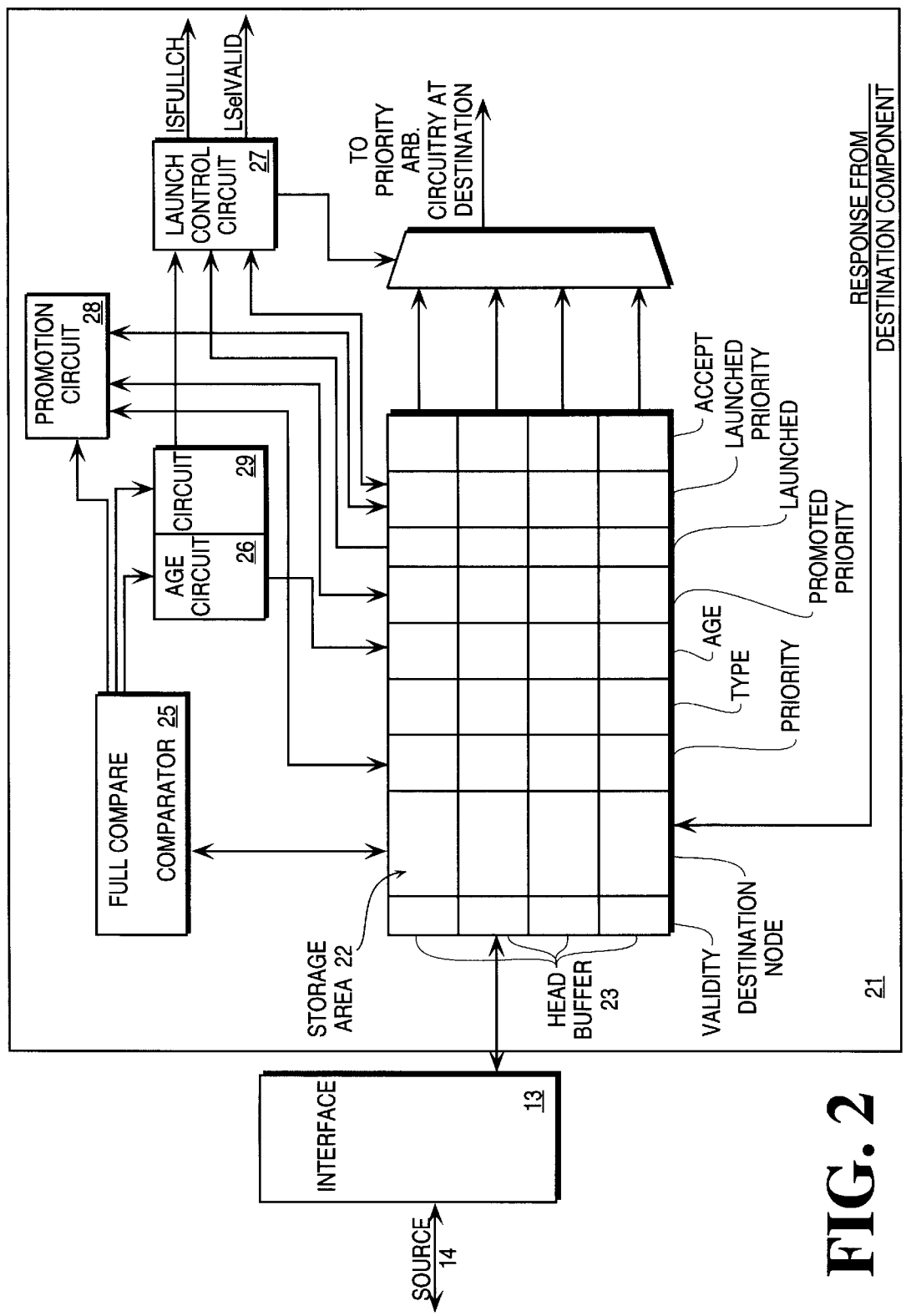
FIG. 2 is a block diagram illustrating source control circuitry in accordance with the present invention which is part of circuit 17 shown in FIG. 1.

FIG. 2 illustrates a block diagram of a circuit 21 which is capable of assuring that only a single packet of data of a given priority will be offered to the priority arbitration circuitry of the destination node at any time and that low priority signals will be unable to deny higher priority signals access to the priority arbitration circuitry.

The circuit 21 may be considered to be a part of the control circuitry 17 and, more specifically, part of the source control portion of the control circuitry 17. The circuit 21 includes storage area 22 which is divided into a plurality of individual header buffers 23; in a preferred embodiment, four buffers 23 for holding individual header information are included. Each of these buffers 23 includes storage space for a number of bits of header information furnished by the source component 14 defining the packet of data with which the header is associated. The data furnished to each buffer 23 by the source component 14 includes the validity of the data, the destination node to which the packet of data is addressed, the priority of the data, and the type of operation to be accomplished on the packet of data. The types of operations important to this description are read response (a reply to a read request) and write or read operations to be arbitrated by priority or by stream number. Stored in each header buffer 23 along with the header information furnished by the source component 14 is certain additional information used to accomplish the purposes of this invention. FIG. 2 illustrates the pertinent control information which may be stored in each buffer 23 for each packet of data.

Connected to receive the new input header information from the interface 13 is a comparator 25. The comparator 25 tests each incoming header for the destination node address, the type (read response or other), and the priority. (The four bits used in the preferred embodiment of the invention to indicate priority are also used to provide a "stream" number" when arbitration is not to be conducted on the basis of priority but rather under control of the destination component. The term priority is used in this specification to indicate both priority and stream values except where the operation differs with priority and stream values.) If any incoming header is directed to the same node, is of the same type (not read response), and has the same priority as a header stored in one of the buffers 23, then this information is transferred to an age circuit 26. The age circuit 26 places an indication in the preexisting header that it contains older information. This is accomplished by having storage (which is labeled "age" in FIG. 2) which receives some initial value (such as 0) from the age circuit 26 when the header information is first stored and is incremented to provided a higher value for each positive comparison (it has the same priority and is either a priority or a stream header) with incoming header information for a new packet. Whenever a header is placed (launched) on a launch bus 18 to be sent to a destination node for arbitration, the eldest header of a particular type of operation of any priority for that node is launched. This assures that the headers will be launched in the proper order from the source node. Details of the age circuit 26 for incrementing the age of older packets and of a circuit 29 for determining the oldest information for launching are discussed below with respect to FIGS. 3 and 4.

Figure 5:
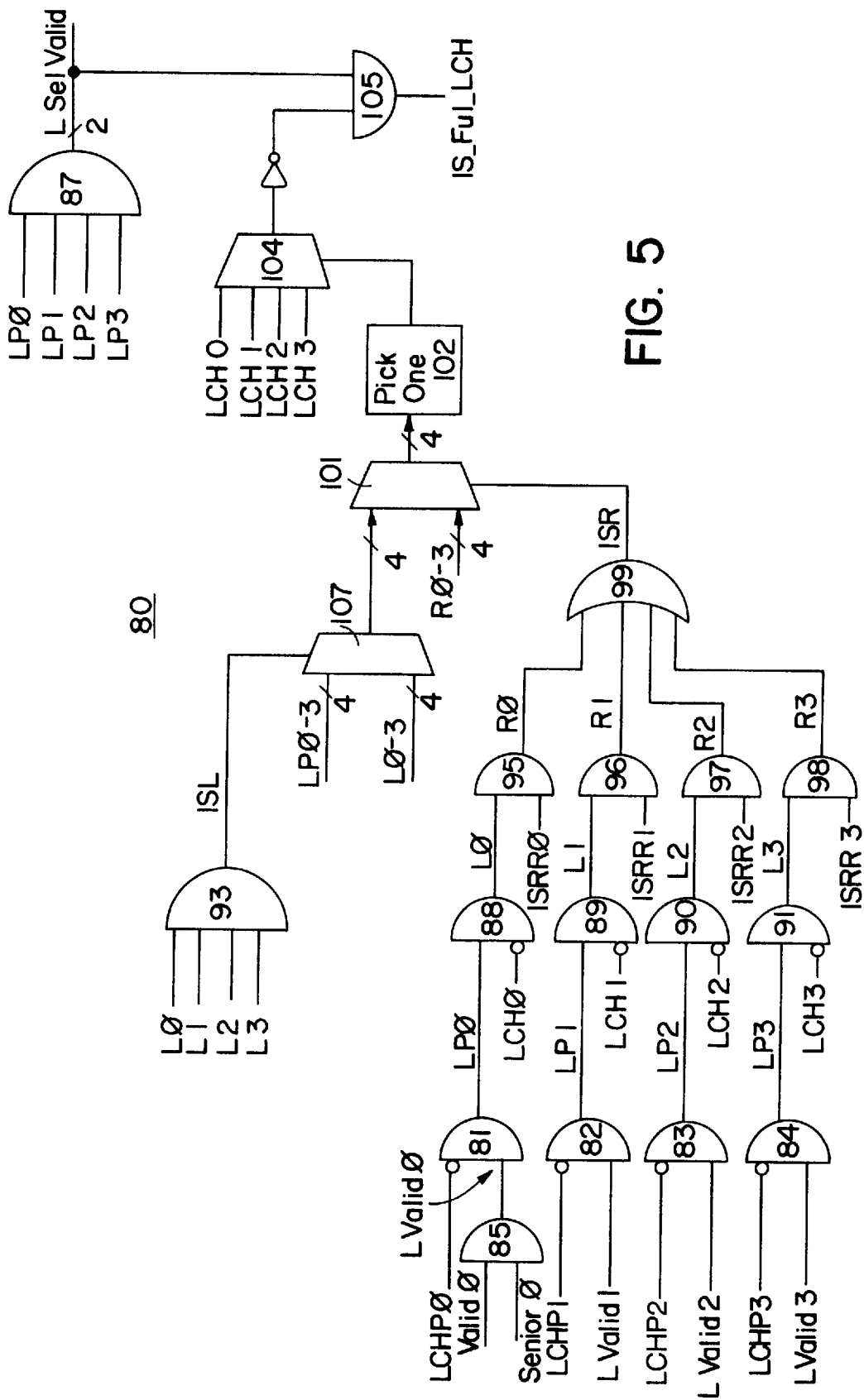
FIG. 5 is a circuit diagram illustrating in detail another portion of the circuitry of the present invention, particularly the launch control circuit 27 shown in FIG. 2.

Also included with the header information in each buffer 23 is a "launched" bit which indicates whether the header information has been launched or not. If the launched bit is cleared, and the header is the oldest of its priority type, then the header is launchable. On each cycle of operation, a launch control circuit 27 of the control circuitry 17 at the source node 12 looks first for a read response type header; if one is present and launchable, it is launched. If no read response type header exists, the launch control circuit 27 looks next for any other priority type header for data which has not yet been launched; if one is present and launchable, it is launched. If no header exists which has not been launched, the launch control circuit 27 looks next for a promoted header; if one is present and launchable, it is launched. It might be noted here that in the interconnect system with which the preferred embodiment of the invention is utilized, read responses have the highest priority of all packets of information since it is clear that some component is waiting for their completion; consequently, a read response need never be, and is never, promoted. The launch control circuit 27 for determining the particular header to be launched is illustrated in FIG. 5 and described in detail hereinafter.

A promotion launch involves a packet which has already been launched but has since had its priority increased (for reasons to be explained hereafter) and a "launched priority" bit cleared. A launch of this header sends the new priority to the destination along with an indication that the information is an update, not a new header. Once a read response or other header for unlaunched stored data has been launched, the launched bit and the launched priority bit for the header in that buffer 23 are set. Before any other header for a packet of the same type addressed to the same node with the same priority is launched, a test is made for the oldest data. If the oldest header has not been launched, it is launched. If the oldest header has already been launched, no younger header may be launched. This assures that the order of launching is maintained and that only one header of any priority and type may be outstanding (launched but not completed) from any source node to any one destination.

When the transfer of a data packet is completed from a source node to a destination node, a signal is returned to the source node. This signal invalidates the header information related to the completed packet so that header information for another packet may be transferred into the particular buffer 23, a new packet of data may be transferred into a source buffer, and the "oldest" status updated.

It should be noted that the interconnect of the above-mentioned patent application is capable of arbitrating the transfer of information for write operations based not only on source defined priority but also on a determination made at the destination that particular information is needed. An arrangement for accomplishing this form or arbitration is disclosed in U.S. patent application Ser. No. 07/815,816 entitled Apparatus For Controlling The Flow Of Data Through A Computer Interconnect Based On The Requirements Of A Destination Component, Roskowski et al, filed on even data herewith, and assigned to the assignee of the present invention. For the sake of a name, this form of arbitration control by the destination is called "stream" arbitration; and the bit positions usually used to store the priority bits of the header contains "stream" designators. These stream designators, along with the destination address, the type of operation, and other header information are compared by the comparator 25 in the same manner as are headers for data packets whose arbitration is based on priorities to maintain the order of transfer of data from the source to the destination node. Thus, only a single packet of a particular stream number may be launched to a particular destination; and this packet will be the oldest packet of that stream number. In this manner, the described circuitry maintains order for stream packets as well as priority packets. One distinction, however, is that stream packets are not promoted since they are transferred as desired by the destination.

It is possible that all of the header buffers 23 at a source node and their associated source buffers will be filled with headers and packets of data of low priority, and the source component will desire to transfer a packet of data of higher priority. Since there is no room for the header related to the higher priority data in the storage area 22, there is no way for the header of higher priority to be launched to the destination node. Consequently, there is no way for the higher priority information to reach the priority arbitration circuitry. This may cause a system deadlock or may simply slow the operation of the system depending upon the nature of the blocked data and its interrelation with the blocking data.

To obviate this problem, the circuit of the present invention promotes the priority of low priority data where higher priority data is blocked. The circuit 25 compares each incoming header, not only to maintain order in the manner discussed above, but also to check priority. If the buffers 23 are all full and a header of higher priority is asserted by the source component, the compare circuit 25 causes a promotion circuit 28 to promote the priority of the oldest header of the highest priority presently in the storage area 22. This is accomplished by providing in each header buffer 23 an area for storing a promoted priority value. This value is initially set equal to the priority level supplied by the source component. When a higher priority header appears, the compare circuit 25 checks to see whether all of the buffers 23 are full by checking the valid bits of the headers in those buffers 23. If all are full, the oldest highest priority header is promoted by receiving a promoted priority equal to the priority of the incoming header. Due to the order described above in which headers are taken, this oldest header will have already been launched to the destination node. This header must thus be relaunched (a promotion launch) so that its promoted priority value can be used by the priority arbitration circuitry at the destination node to determine which packet of data to use first at the destination node. Depending on the particular circuitry, the entire header or only the promoted priority information need be included in the promotion launch. The details of a priority promotion circuit 28 are described in detail below with respect to FIG. 7.

In a preferred embodiment on the invention, the entire header including both the actual priority and the promoted priority are transferred to the destination node on a priority launch so that the destination component can decide which to consider in deciding which packet of data to transfer next. The promoted priority is always used in the priority arbitration at the destination node in order to accomplish the clearing of low priority header blockages. However, it is possible that the hardware of a destination component might need the non-promoted priority value, and so both are made available to the destination component.

Once a promoted header is launched and is available for arbitration at the destination node, arbitration will occur; and the data packet with the promoted priority will ultimately be transferred from the source node. This transfer will remove the blockage by causing some header space to become available in storage area 22 for the higher priority header contesting for arbitration.

As explained above, in a preferred embodiment of the invention, the oldest highest priority packet to any destination node is chosen for priority promotion. The circuitry might also be arranged to promote first the oldest highest priority packet to the specific destination node to which the higher priority packet is addressed. However, this would probably take longer in releasing a header buffer 23 for the higher priority header.

Figure 3:
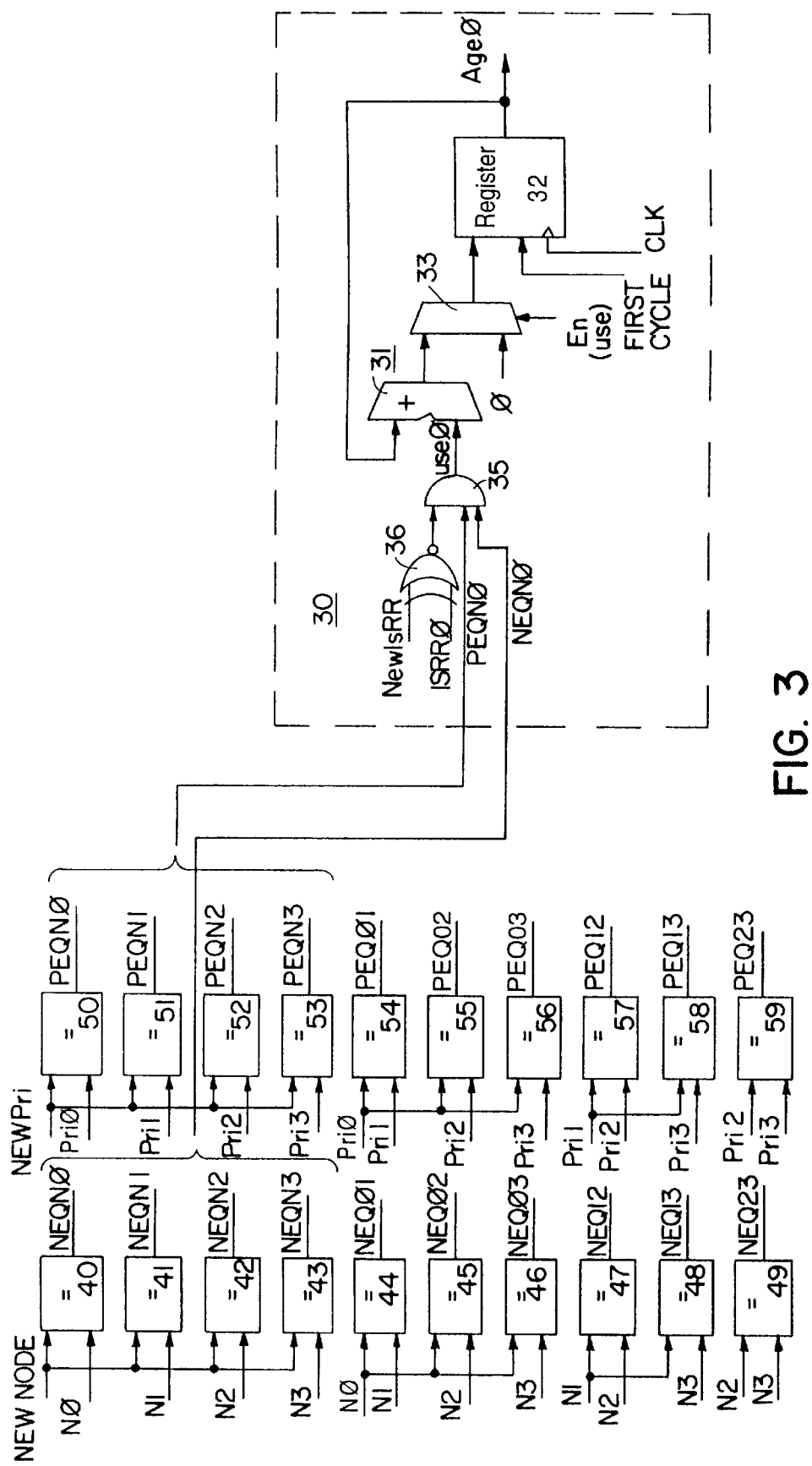
FIG. 3 is a circuit diagram illustrating in detail a portion of the circuitry of the present invention, particularly the circuits 25 and 26 shown in FIG. 2.

Illustrated in FIG. 3 is a circuit 30 which may be used for designating the age of information in order to determine which information of a particular type (read response, priority, or stream) directed to a particular node is to be first launched. The circuit 30 is repeated for each of the header buffers 23 at each source node. The circuit 30 includes an adder 31 which receives a two bit indication of the present age of a packet from a register 32 which stores that value. The register 32 holds the age value stored in the header buffer. The adder 31 also receives an increment signal which directs it to increment or not. The value provided by the adder 31 is transferred as one input to a multiplexor 33. The multiplexor 33 receives a second input which is a zero value. The multiplexor 33 is controlled by an enable signal EN which indicates whether this particular circuit 30 is the circuit associated with the particular header buffer being tested and whether the storage area associated with the header is being loaded with a new packet of information. If new information is being loaded into the storage buffer, the enable signal selects the zero value for transfer to the register 32 to indicate the age. If this is not a buffer being loaded but one which may contain information of the same type directed to the same node and of the same priority, then a signal from the adder 31 indicating whether to increment the age value is transferred to the input of the register 32. The information from the multiplexor 33 is transferred into the register 32 if the new header signal (first cycle) is present to enable the register 32. The age value in the register 32 is provided at the output of the register 32. This age value is the age value of a packet the header for which is stored in one of the header buffers. Each header buffer 23 has associated therewith similar circuitry for generating an age for the packet indicated by the header information.

The increment signal to the adder 31 is provided by an AND gate 35 which receives an input signal PEQN0 (0 indicating the zero numbered one of four header buffers) indicating that the priorities of the new packet and the packet being compared are the same. The AND gate 35 also receives an input signal NEQN0 indicating that the nodes to which the new packet and the packet being compared are directed are the same. A third signal to the AND gate 35 is furnished by an exclusive NOR gate 36 which receives a signal indicating whether the new packet is a read response and a signal indicating whether the packet being compare is a read response. If both packets are not read responses or both packets are read responses, the gate 36 produces a one. Thus, an incrementing signal is provided if both packets are not read responses or both packets are read responses, and the packets have the same priority, and they are directed to the same node.

In order to determine whether the packets are directed to the same node and generate a signal NEQN0 and for other purposes, a series of comparators 40–49 are provided. The comparators 40–49 may be a portion of the compare circuit 25 shown in FIG. 2. The comparators 40–43 compare the value of the new header destination node with the destination node value stored in each of the header buffers. A one output is generated if the new packet is directed to the same node as is the packet in the associated header. Thus the signal NEQN0 is one if the new packet and the packet indicated by the header in header 0 are directed to the same destination node. Similarly, the signals NEQN1–3 are ones if the new packet and the packets indicated by the header buffers 1–3 are directed to the same destination node.

In a similar manner, the comparators 44–49 indicate whether the node to which the packets indicated by the headers in the header buffers 0–3 are directed are the same. If any two headers indicate packets directed to the same node, a one is produce as an output signal NEQXX (where the Xs indicate the headers compared).

In a similar manner, in order to determine whether the packets are of the same priority and generate a signal PEQN0 (0 indicating header buffer 0), a second series of comparators 50–59 are provided. The comparators 50–59 may be a portion of the compare circuit 25 shown in FIG. 2. The comparators 50–53 compare the value of the new header priority with the priority value stored in each of the header buffers. A one output is generated if the new packet is of the same priority as is the packet in the associated header. The comparators 54–59 indicate whether the priority of the packets indicated by the headers in the header buffers 0–3 are the same. If any two headers indicate packets of the same priority, a one is produce as an output signal PEQXX (where the Xs indicate the headers compared).

It should be noted here that when a packet of information is a stream packet the arbitration of which is controlled by the destination node rather than the source node, the four bits used to indicate priority are instead used to indicate the stream value. Thus, when the comparators 50–59 compare the values of headers which indicate streams rather than priorities, comparisons of stream numbers are made automatically rather than comparisons of priorities. Since the comparison values are used, as will be seen, to determine launching, stream packets as well as priority packets are launched on the basis of age and in the proper order.

Thus, as has been demonstrated, whenever a new packet of information is stored in a storage buffer of the storage area 16, the type, destination node, and priority are checked; and the age of all other packets of the same type of the same priority directed to the same node have their age incremented.

Figure 4:
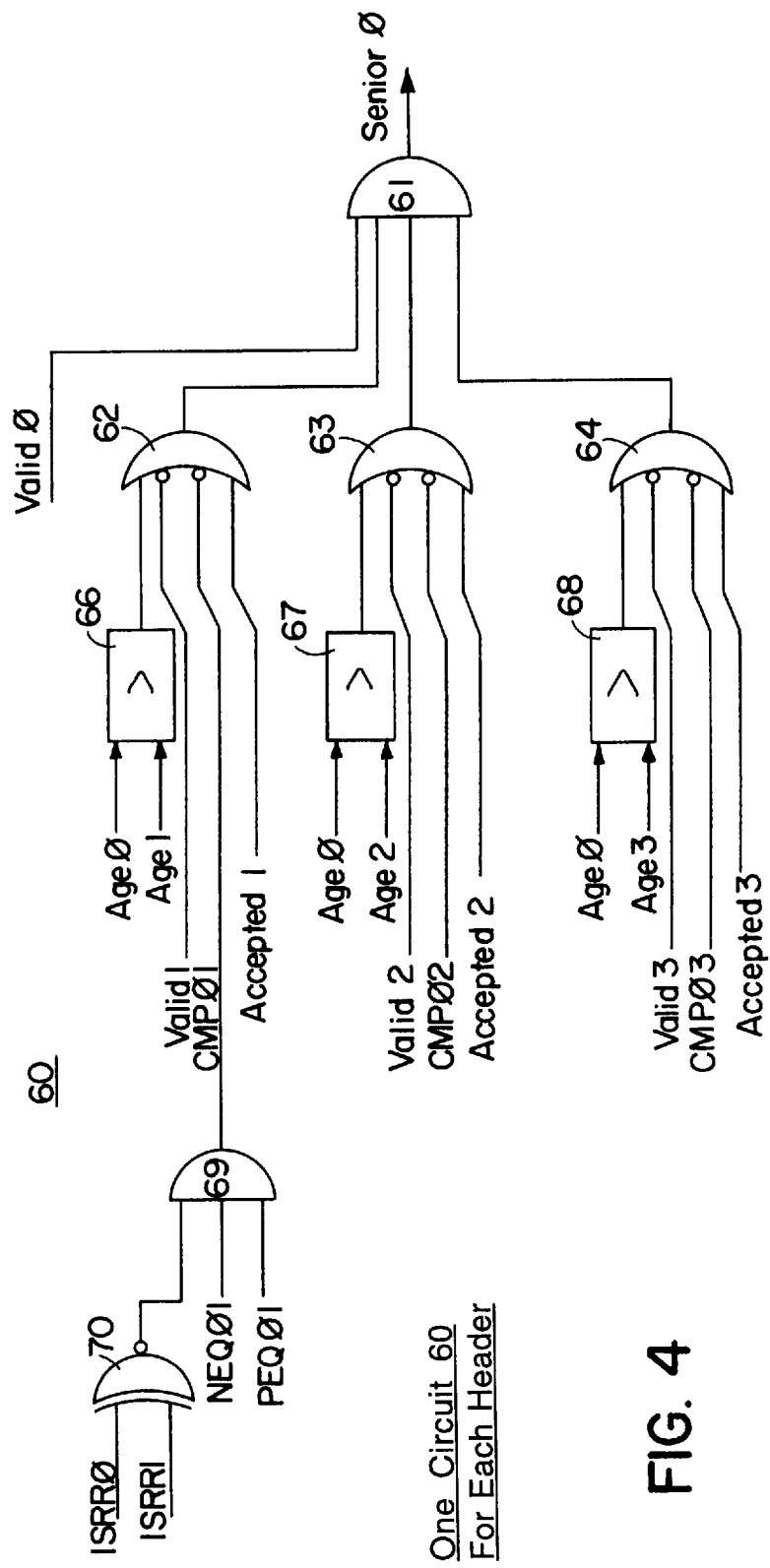
FIG. 4 is a circuit diagram illustrating in detail another portion of the circuitry of the present invention, particularly the circuit 29 shown in FIG. 2.

In order to determine which is the most senior of the headers of a particular type directed to a particular node and is thus ready to be launched, a circuit 60 shown in FIG. 4 is utilized; one circuit 60 is utilized for each header buffer 23 at each node. Each circuit 60 is a portion of the circuit 29 shown in FIG. 2. Such a circuit 60 includes an AND gate 61 which receives four input values. The first value indicates that the header at that buffer is valid. The other three signals indicate that the header at that buffer is more senior than the headers at the other header buffers for some reason or other. Each of these other three inputs is the output of an OR gate 62–64. The inputs to the OR gates 62–64 include a first input from a comparator 66–68 which produces a one if the age of the packet at the header buffer is older than the age of a packet indicated by another header. A second input to the OR gates 62–64 is a one indicating the header in the buffer is more senior if the other packet is not valid. A third input signal CMP01, CMP02, or CMP03 to the OR gates 62–64 is a one if the packets in the buffers being compared are not of the same type and directed to the same node and not either both read responses or not read responses. A fourth signal "Accepted#" is a one if the packet of data to which the header pertains has already been selected by the arbitration circuitry at the destination node for transfer to the destination component. This signal allows a packet already accepted for transfer to be disregarded in the selection process which provides a most senior packet so that a new header of the same priority may be launched to the same node.

A single circuit for furnishing the signal CMP01 is shown in FIG. 4. A similar circuit is used for furnishing each of the signals CMP02 and CMP03. As may be seen, an AND gate 69 receives the output of an exclusive NOR gate 70. The exclusive NOR gate 70 produces a one when the headers are both read responses or are both not read responses. The AND gate 69 also receives signals indicating equal priorities and the same destination nodes for the two headers being compared; these equal priorities and the same destination signals are generated by the comparators 44–49 and 54–59 of FIG. 3.

Thus, the AND gate 61 for each header buffer 23 provides a one value if the packet indicated by its header is determined to be the most senior. If a one is furnished for the header at the particular node, then that signal should be the next of that type to be launched to a particular destination node. Moreover, as will be seen, only senior packets are launched; younger packets never reach the selection mechanism so that only one header of a particular priority directed to a particular destination is launched at any one time.

In order to determine which packet is to be launched at any particular time, a circuit 80 illustrated in FIG. 5 is utilized. The circuit 80 resides in the launch control circuit 27 of FIG. 2. The circuit 80 is used to determine whether a packet is a read response packet and should be launched first, a senior packet needing an initial launch which should be next launched, or a packet needing a promotion launch which is last to be launched. The circuit 80 includes a tree arrangement used to accomplish the selection of the correct packet. The tree includes a number of AND gates 81–84. The gates 81–84 each receive an input signal LCHP0-3 indicating that a priority launch should take place for a packet associated with a particular header buffer. This is accomplished by reading the condition of the launch priority bit for that header buffer. It will be zero if a priority promotion has occurred but the promoted priority has not been launched to the destination. It will also be a zero if no launch of the header has ever occurred since this bit is cleared with the launch bit when a new header is first received. The other input to each of the AND gates 81–84 is a signal indicating that the particular header is valid as determined from the valid bit in the header buffer 23 and that it is a senior header as indicated by a one provided by an AND gate 85. Only one AND gate 85 is shown, but a similar input is provided for each of the AND gates 81–84.

Any AND gate 81–84 which is valid, senior, and has a priority or initial launch ready will produce a one at its output as a signal LP0-3. The presence of such a signal indicates that some form of header launch is available. Consequently, the signals LP0-3 are sent to an OR gate 87 which produces a one to indicate that some form of header launch is to take place. Each signal LP0-3 is also sent to an AND gate 88–91. Each of these AND gates 88–91 also receives a signal LCH0-3 which indicates that this is an initial launch of the header. A zero in the launch bit of the header buffer provides this information. The presence of both an initial launch ready signal and a signal LP0-3 causes a particular AND gate 88–91 to generate a one output signal L0-3.

The presence of a signal L0-3 indicates that a first launch of a new header is ready. Consequently, these signals L0-3 are transferred to an OR gate 93, a one output signal ISL from which indicates a new header launch is ready. The signals L0-3 are also each furnished as an input to one of four AND gates 95–98. Each of the AND gates 95–98 also receives an input indicating that the header buffer stores a read response type indication. Thus, a one output signal R0-3 from any AND gate 95 indicates that a read response is ready to be launched. The signals R0-3 are sent to an OR gate 99 which produces a one signal ISR when a read response is ready to be launched.

If an ISR signal is present indicating a read response packet is ready to be launched, the ISR signal enables a multiplexor 101 to transfer all available ones of the R0-3 signals to a circuit 102 which picks one for transfer. The signal picked makes no difference since all available at this point are launchable and all are of the highest priority to their respective nodes. The signal picked selects the one of the launch bit values LCH0-3 associated with that header buffer 23 at a multiplexor 104. The value of the launch bit LCH0-3 is inverted and sent to an AND gate 105 along with the signal produced by the OR gate 87. If the value of the signal LCH0-3 is a zero, this indicates that this is an initial launch of the header information. Signals to indicate this are transmitted on the IS_FUL_LAUNCH and L_SEL_VALID lines from the launch control circuit as is illustrated in FIG. 2. If the launch bit of the header selected is a one indicating a first launch has already taken place for that header, then only the L_SEL_VALID signal is sent to the destination component from the source node to indicate that the launch is a priority promotion launch.

If an ISR signal is not present, then the multiplexor 101 transfers a signal provided by a multiplexor 107. The signal transferred is selected by the signal ISL which if a one indicates a first launch of a new header rather than a priority promotion launch. If a first launch of a header is available, then this signal L0-3 is transferred by the multiplexor 107 and the multiplexor 101 to the circuit 102. If a first launch of a new header is not available, then a priority launch signal LP0-3 is selected by a zero on the ISL line.

Thus, the circuitry shown in FIG. 5 determines the header to be launched with read response headers being first launched followed by first launches of priority or stream information and finally by promotion launches of priority information. Moreover, since only senior headers are launched, only one header of a particular priority will be outstanding at any time to any destination from any source node.

Figure 6:
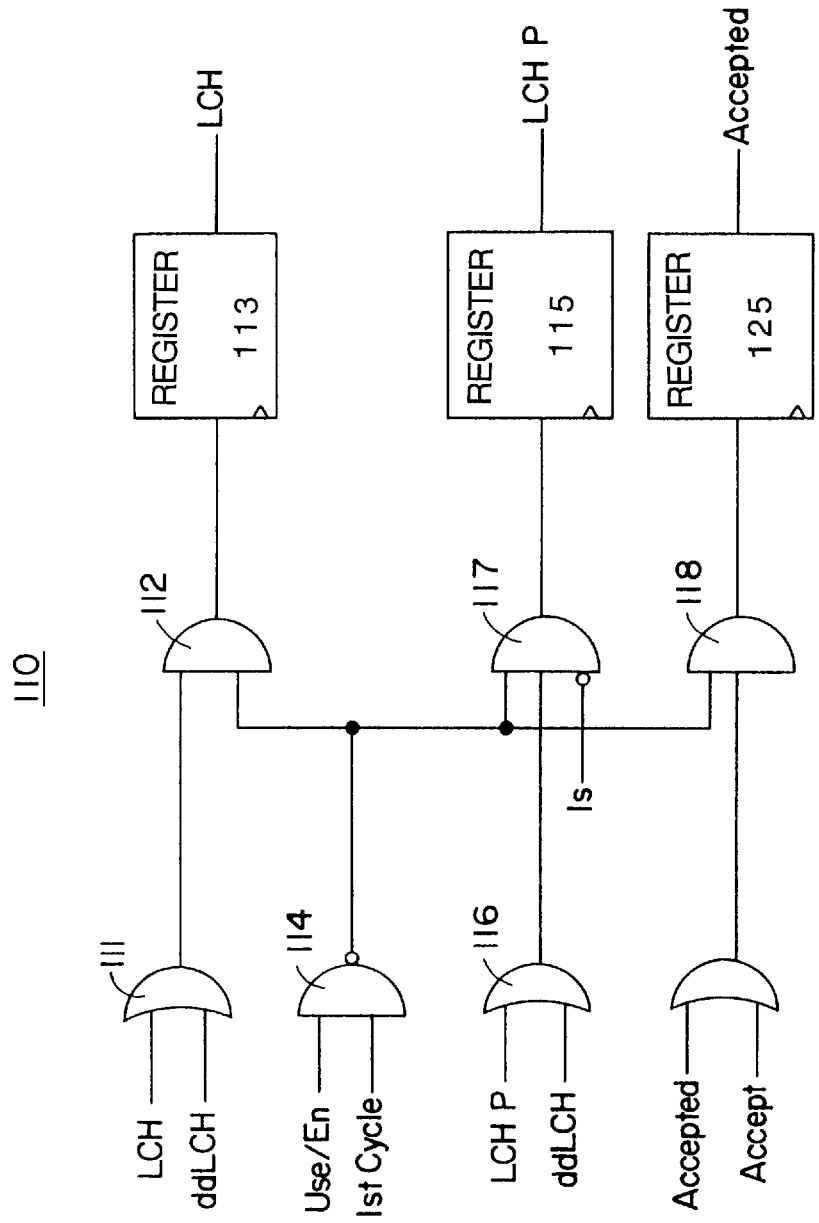
FIG. 6 is a circuit diagram illustrating in detail an additional portion of the circuitry of the present invention used to generate signals used in the launch control circuit 27 and the circuit 29 of FIG. 2.

FIG. 6 includes circuitry 110 which may be utilized in the preferred embodiment of the invention for changing the values of the launch and priority launch bits of the header buffers 23 and an accept bit to indicate that a packet has already been accepted for transfer to a destination component. These signals are used in the circuits 27 and 29 shown in FIG. 2. The circuit 110 includes an OR gate 111 which receives a one if the launch bit in the header buffer is already a one or when this packets launch occurs on this particular clock cycle. The presence of one of these values is provided to an AND gate 112. The absence of a signal indicating a new header on the other input to the AND gate 112 allows a register 113 holding the launch bit to be set. This value is fed back to hold the one in the register 113 until an enable signal EN indicating the selected buffer and a first cycle signal indicating a new header are received to reset the register 113 to a zero. Thus, the register is set to a one when a launch of a header occurs and is reset when a new header occurs. In a similar manner, a launch priority signal and a launched-on-this-cycle signal are furnished to an OR gate 116 and to an AND gate 117. These signals along with signals indicating the absence of a new header, and the absence of a priority promotion signal are used to set the launch priority bit in the register to one. Thus, a reset occurs of the launch priority bit whenever a priority promotion occurs or a new header is furnished to a header buffer.

In a similar manner, an AND gate 118 transfers an accept signal provided by a destination component in the absence of a signal indicating a new header to a register 125. The register 125 stores the accept bit as a part of the header stored in the particular header buffer. The destination component provides the accept signal when it has arbitrated and selected a packet of information to be transferred to itself. The accept signal is transferred back to the source node and allows the accepted packet to be excluded from the seniority determination by which the next header to be launched is determined.

Figure 7:
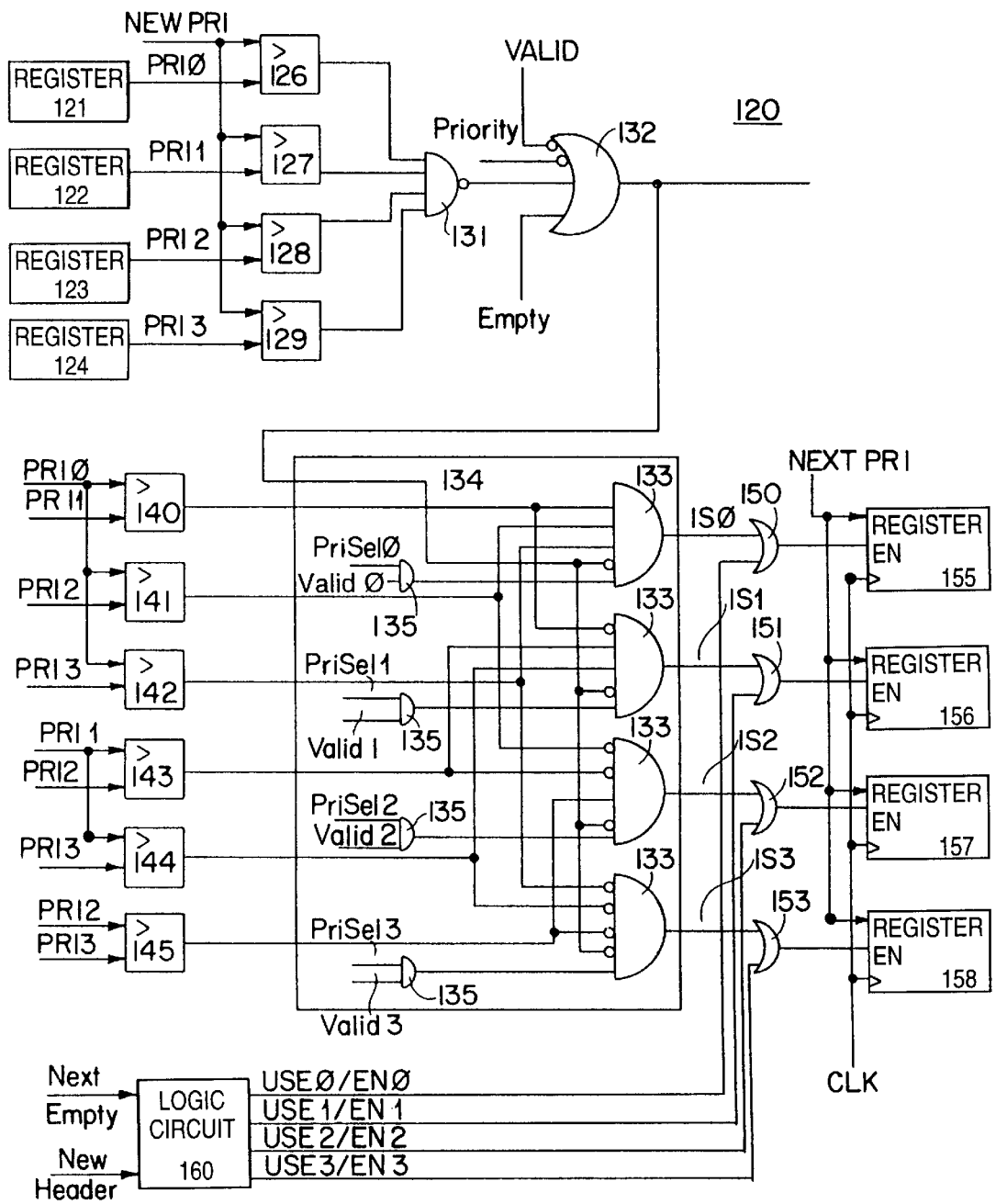
FIG. 7 is a circuit diagram illustrating in detail yet another portion of the circuitry of the present invention, particularly the priority promotion circuit 28 and parts of the comparison circuit 25 shown in FIG. 2.

A circuit 120 for accomplishing priority promotion is illustrated in FIG. 7. A substantial portion of this circuit 120 resides in the circuit 28 of FIG. 2. The circuit 120 includes four registers 121–124 in which are stored the priorities of the four packets presently held in the storage areas 16A–D of the source node. These registers 121–124 may be part of the header storage 23 illustrated in FIG. 2 which store the priority information. The signals PRI 0–3 in each of the registers 121–124 are transferred as inputs to one of four comparators 126–129 which may be part of the full comparator circuit 25 shown in FIG. 2. Thus, each comparator 126–129 receives a priority value indicating the priority of one of the packets stored. All of the comparators 126–129 also receive a value indicating the priority of a new packet attempting to be recognized by the source node. The comparators 126–129 each compare the new priority value to the value of a signal PRI 0–3 in one of the storage areas and provide an active high output if the new signal is greater than signal indicating the priority of the packet stored in the particular storage area. If the new priority is greater than the priorities of all of the data packets presently stored, a NAND gate 131 will propagate a low (zero) at its output as input to an OR gate 132. As may be seen, the OR gate 132 also receives signals indicating whether the new header is valid, whether a storage buffer 16A–D is empty, and whether the new packet carries priority data. The OR gate 132 generates a low value only if the data being presented for the new packet is valid, the type of data is a priority packet, no buffer is available in storage area 16, and the new priority is higher than the priorities of all of the packets presently stored. This zero signal is used to indicate to a circuit 134 that a priority promotion is to occur. It does this by failing to disabled the circuit 134. If the new header is not of higher priority than those presently stored, if there is storage space available in area 16, if the new packet is not valid, or if the new packet does not contain priority data, a disabling one output is generated by the OR gate 132 to indicate that this is not a case for priority promotion.

The circuit 134 is a logic circuit which selects among its input signals for the largest digital value. The circuit 134 receives six individual values (in the preferred embodiment) each of which represents the digital output produced by one of six individual magnitude comparators 140–145. The magnitude comparators may be a part of the comparator circuit 25 of FIG. 2. Each magnitude comparator 140–145 receives two digital inputs of four bits each which represent the priority values of the packets of data stored in two of the storage areas 16A–D. Thus, comparator 140 receives values representing the priorities of the packets in storage areas 16A(0) and 16B(1). Each comparator 140–146 produces a high value (one) if the value on the upper of the two inputs is greater than that on the lower.

The circuit 134 receives the six values indicating the higher of the six different pairs of signals indicating priority of all packets stored and furnishes an output signal (assuming the output of the OR gate 132 is not high) on a line which indicates which of the storage areas has the highest priority packet. To accomplish this, the circuit 134 includes a plurality of AND gates 133 which receive the input signals from the comparators 140–145 indicating which of two headers has a higher priority value. As may be seen, different combinations operate different gates 133. The AND gates 133 are all enabled by a low value input signal or disabled by a high value input signal passed by the OR gate 132. Each AND gate 133 also receives an enabling one value input from an AND gate 135 if the header in the header buffer is valid and is a priority packet header. It should be noted that the manner of coding the bits which indicate priority in a header uses a one in the highest of these four bits to indicate a priority packet and a zero to indicate a stream packet. This bit is sent to the AND gate 135 so that the AND gates 133 provide a one output only for priority packets and not for stream packets.

Thus, if the storage area 16A (0) stores a priority packet of the highest priority of the packets stored, each of the comparators 140–142 produces a one. These values are transferred to the upper AND gate 133. If a promotion is to occur because the priority of the header seeking access to the node is of a higher priority, the signal from the OR gate 132 will be low. Moreover, the priority select signal for header buffer 0 will indicate that the header represents a priority package; and the valid bit will indicate that the header is valid. Thus, the upper AND gate 133 will transfer a high value on the output ISO.

This value is transferred by one of four NOR gates 150–153 to one of four registers 155–158 each of which stores the promoted priority of the packet involved. This is accomplished by using the output of the one of the OR gates 150–153 which is active high as an enable signal to the associated register and furnishing the priority of the packet requesting access to the source node as the input value to all of the registers 155–158. In this manner, the priority of the highest valued packet is promoted to the value of the incoming packet requesting access so that the promoted packet will be first selected by the priority arbitration circuitry of the destination node 14.

If any of the storage buffers 16A–D is available for a new packet, the OR gate 132 provides a high value at its output, disabling the circuit 134. In this case, the OR gates 150–153 receive an input value USE0-3 from a logic circuit 160 indicating the empty storage area. This value enables one of the registers 155–158 to store the priority of the incoming data packet. The original priority is stored in both the priority value of the header and the promoted priority value positions.

Thus the circuitry of the present invention provides with the priority and stream arbitration circuitry of the above-mentioned patent applications, a type of priority arbitration which is accomplished in two places. At the source node, this arbitration determines the next header to launch; at the destination node, the arbitration determines the next packet of data to present to the destination component. The circuitry provides that if a header has been launched and its priority has been promoted, this promoted priority is passed on to the destination node to update the copy of the header at that node. This may have the effect of changing the packet of data which is next selected for transfer to the destination if the destination has not yet begun the transfer of the packet. If the transfer of the packet has been completed but the source has not yet been notified, then the promotion is ignored.

An especially important aspect of the invention will be noted by those skilled in the art. Since the oldest header of the highest priority available at a source node is always chosen for priority promotion, the fact of promotion has no effect on the order in which the information available at the source node is presented. Even though the particular packet may be presented sooner than packets of higher priority from other sources, it is presented in the same order as it would otherwise have appeared from its source. Thus, order is maintained even though priority values are promoted.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A circuit for maintaining the order of transmission of information in a computer interconnect comprising control circuitry for sending a signal from, a first device coupled to a source of data to a second device receiving data from said first device, indicating that data is ready for transfer, said second device being coupled to a destination for data, the control circuitry comprising a plurality of buffers for storing information relating to the data, the information including information indicating the order in which the information was received by the control circuitry and information for designating a priority for the data ready for transfer, means for incrementing the information indicating the order in which the information was received by the control circuitry, means for sending the information relating to the data to said second device in the order of receipt by the control circuitry, wherein the order of receipt is an order of receipt within a given priority.

2. A circuit for maintaining the order of transmission of information in a computer interconnect as claimed in claim 1 further comprising means for including the priority level in the information relating to the data sent to said second device.

3. A circuit for maintaining the order of transmission of information in a computer interconnect as claimed in claim 2 further comprising means for increasing the priority of data having a lessor priority to a higher priority.

4. A circuit for maintaining the order of transmission of information in a computer interconnect as claimed in claim 3 in which the means for increasing the priority of data having a lessor priority to higher priority includes means for determining the eldest highest priority data, and means for increasing the priority of such data.

5. A circuit for maintaining the order of transmission of information in a computer interconnect as claimed in claim 4 in which the means for increasing the priority of such data includes means for increasing the priority to a priority level equal to the priority of data which is blocked out.

6. A circuit for maintaining the order of transmission of information in a computer interconnect as claimed in claim 4 in which the means for determining the eldest highest priority data includes means for comparing the priority of information of each item from the source with data of the same priority, and means for operating the means for incrementing the information regarding the order in which information was received of any data of the same priority each time a positive comparison occurs.

7. A circuit for maintaining the order of transmission of information in a computer interconnect as claimed in claim 6 further comprising means for signalling said second device that a priority for data has increased.

8. A circuit for maintaining the order of transmission of information in a computer interconnect as claimed in claim 7 in which the means for signalling said second device that a priority for data has increased includes means for determining whether the information relating to the data has been sent to said second device.

9. A circuit for maintaining the order of transmission of information in a computer interconnect as claimed in claim 1 in which the control circuitry for sending a signal from said first device to said second device indicating that data is ready for transfer further comprises means for launching information regarding only a single packet of information at each priority level.

10. A circuit for maintaining the order of transmission of information in a computer interconnect as claimed in claim 9 further comprising means for including the priority level in the information relating to the data sent to said second device.

11. A circuit for maintaining the order of transmission of information in a computer interconnect as claimed in claim 10 further comprising means for increasing the priority of data having a lessor priority to a higher priority.

12. A circuit for maintaining the order of transmission of information in a computer interconnect as claimed in claim 11 in which the means for increasing the priority of data having a lessor priority to higher priority includes means for determining the eldest highest priority data, and means for increasing the priority of such data.

13. A circuit for maintaining the order of transmission of information in a computer interconnect as claimed in claim 12 in which the means for increasing the priority of such data includes means for increasing the priority to a priority level equal to the priority of data which is blocked out.

14. A circuit for maintaining the order of transmission of information in a computer interconnect as claimed in claim 12 in which the means for determining the eldest highest priority data includes means for comparing the priority of information of each item from the source with data of the same priority, and means for operating the means for incrementing the information regarding the order in which information was received of any data of the same priority each time a positive comparison occurs.

15. A circuit for maintaining the order of transmission of information in a computer interconnect as claimed in claim 14 further comprising means for signalling said second device that a priority for data has increased.

16. A circuit for maintaining the order of transmission of information in a computer interconnect comprising control circuitry for sending a signal from a first device coupled to a source of data to a second device receiving data from said first device indicating that data is ready for transfer, said second device being coupled to a destination for data, the control circuitry comprising a plurality of buffers for storing information relating to the data, the information including information for designating a priority for the data ready for transfer, and means for sending for said priority, the information relating to the data to said second device in the order of receipt by the control circuitry.

17. A circuit for maintaining the order of transmission of information in a computer interconnect as claimed in claim 16 further comprising means for increasing the priority of data having a lessor priority to higher priority.

18. A circuit for maintaining the order of transmission of information in a computer interconnect as claimed in claim 17 in which the means for increasing the priority of data having a lessor priority to higher priority includes means for determining the eldest highest priority data, and means for increasing the priority of such data.

19. A circuit for maintaining the order of transmission of information in a computer interconnect as claimed in claim 18 in which the means for increasing the priority of such data includes means for increasing the priority to a priority level equal to the priority of data which is blocked out.

20. A circuit for maintaining the order of transmission of information in a computer interconnect as claimed in claim 19 in which the means for determining the eldest highest priority data includes means for comparing the priority of information of each item from the source with data of the same priority.

21. A circuit for maintaining the order of transmission of information in a computer interconnect as claimed in claim 16 in which the means for determining the eldest highest priority data includes means for providing information indicating the order in which the information was received by the control circuitry, and means for incrementing the information indicating the order in which the information was received by the control circuitry of any data of the same priority each time a positive comparison occurs.

22. A circuit for maintaining the order of transmission of information in a computer interconnect as claimed in claim 20 further comprising means for signalling said second device that a priority for data has increased.

23. A circuit for maintaining the order of transmission of information in a computer interconnect as claimed in claim 22 in which the means for signalling said second device that a priority for data has increased includes means for determining whether the information relating to the data has been sent to said second device.

24. A method for controlling transmission of information in a computer interconnect controlled by a control circuit, said method comprising:

sending a signal from a first device coupled to a source of data to a second device which receives data from said first device, said signal indicating that data is ready for transfer to said second device;

storing information relating to said data, said information including information indicating the order in which the information was received by the control circuit and information for designating a priority for the data ready for transfer;

incrementing the information indicating the order in which the information was received by the control circuity; and sending data to said second device in the order of receipt by the control circuit, wherein the order of receipt is an order of receipt within a given priority.

25. A method for controlling transmission of information in a computer interconnect controlled by a control circuit as claimed in claim 24 wherein said method further comprises including the priority level in the information relating to the data sent to the destination for data.

26. A method for controlling transmission of information in a computer interconnect controlled by a control circuit as claimed in claim 25 wherein said method further comprises increasing the priority of data having a lessor priority to a higher priority.

27. A method for controlling transmission of information in a computer interconnect controlled by a control circuit as claimed in claim 26 which increasing the priority of data having a lessor priority to a higher priority includes determining the eldest highest priority data, and increasing the priority of such data.

28. A method for controlling transmission of information in a computer interconnect controlled by a control circuit as claimed in claim 27 wherein said method further comprises signaling a destination for data that a priority for data has increased.

* * * * *